United States Patent [19]

Dickson

[11] 4,173,016
[45] Oct. 30, 1979

[54] INTERPERSONAL-INTRODUCTION SIGNALLING SYSTEM

[76] Inventor: Carlisle H. Dickson, 2805 N. Humbolt, Milwaukee, Wis. 53212

[21] Appl. No.: 866,921

[22] Filed: Jan. 4, 1978

[51] Int. Cl.² ............................................. G01S 9/56
[52] U.S. Cl. ............................ 343/6.8 R; 343/6.5 R; 340/152 T; 340/505; 340/567
[58] Field of Search ........... 343/6.5 R, 6.5 LC, 6.8 R; 340/152 T, 213.2, 226, 408, 258 R, 504, 505, 567; 325/55

[56] References Cited

U.S. PATENT DOCUMENTS

| | | | |
|---|---|---|---|
| 3,159,832 | 12/1964 | Cox, Jr. | 343/6.5 R |
| 3,696,384 | 10/1972 | Lester | 340/152 T |
| 3,772,668 | 11/1973 | Smith | 340/152 T |
| 3,851,334 | 11/1974 | Coleman et al. | 343/6.5 R |
| 3,882,497 | 5/1975 | Klass et al. | 343/6.5 LC |
| 3,969,725 | 7/1976 | Couvillon et al. | 343/6.5 R |
| 4,031,513 | 7/1977 | Simciak | 340/152 T |
| 4,081,747 | 3/1978 | Meyerle | 325/55 |

Primary Examiner—Maynard R. Wilbur
Assistant Examiner—Lawrence Goodwin
Attorney, Agent, or Firm—Andrus, Sceales, Starke & Sawall

[57] ABSTRACT

An interpersonal-introduction signalling system includes a receiving and transmitting transceiver having a relatively short range response and of such size as to permit convenient carrying by a person. A code system defines a plurality of categories, each of which has a particularly identifiable characteristic. Each person carrying a similar receiving and transmitting transceiver can select a particular code to send and a particular code to accept, such that designated information is transmitted and/or received. When accepting a signal or information, a different signal is sent by the receiver to indicate the acceptance to the person transmitting. The transceiver includes an indicator to alert the receiving person and indicate the necessity of transmitting a response. Thus, the encoding permits the several persons involved to define the different categories of persons having selected unique characteristics for contact.

9 Claims, 7 Drawing Figures

INTERPERSONAL-INTRODUCTION SIGNALLING SYSTEM

BACKGROUND OF THE INVENTION

This invention relates generally to selectively encodable systems for establishing communication between two parties under the independent control of such parties.

In the prior art, various radio-type signalling systems have been disclosed for various purposes. Reference may be made to the following as showing various systems.

U.S. Pat. No. 2,845,619 to Robert E. Rawlings 7-29-58
U.S. Pat. No. 3,440,635 to H. B. Hull 4-22-69
U.S. Pat. No. 3,473,127 to R. E. Williams et al 10-14-69
U.S. Pat. No. 3,478,344 to F. K. Switzgebel et al 11-11-69
U.S. Pat. No. 3,588,858 to Thomas P. Demuth 6-28-71
U.S. Pat. No. 3,609,741 to Wendell S. Miller 9-28-71
U.S. Pat. No. 3,618,059 to Milton F. Allen 11-2-71
U.S. Pat. No. 3,796,958 to Paul M. Johnston et al 3-12-74

The patents disclose various modes of radio communication for different purposes which may be briefly summarized as follows.

Rawlings discloses encoded transponder signals in a radar system, and Miller discloses baggage protection transponding apparatus.

Hull discloses a personal broadcasting device for direction finding in police work and the like.

Williams discloses a broadband detector for covert radio frequency broadcasts.

Switzgebel discloses a central station communication with portable remote transceivers.

Demuth discloses a portable transmitter with automatically actuated means to signal a mishap to the user.

Allen generally discloses a magnet-controlled switch in an alarm system for protecting articles, and Johnston discloses particular transmitter circuitry.

Although such devices have been suggested, none are uniquely constructed and interrelated to permit a unique matching of parties based upon selective actuation of the units by the two parties involved. Thus, in various situations, it would be highly desirable if a party could transmit to a total class of different categories or subclasses in accordance with any one of a plurality of categories and with those within a particular category notified and capable of responding automatically or selectively.

Thus, the prior art does not suggest a personal selection and contact means from a category of persons which is provided by the structure and functional results and advantages of the present invention, which is fully set forth in the following description.

SUMMARY OF THE PRESENT INVENTION

The present invention is directed to a system of introducing people to each other by matching remote calls-and-responses based upon preselected encoding transmitted and received signals representing predetermined characteristics. In the present invention, two or more persons have individual transmit-and-receive apparatus which are selectively encoded to transmit, and to respond, only to selected broadcasted signals representing one or more characteristics such as desired physical and/or mental states or characteristics. An individual transmits a selected signal which will be received by any other apparatus tuned to such signal, and, if conditioned, activated to indicate such receipt. A special different encoded signal is transmitted by the receiving apparatus which, in turn, is received by the transmitting apparatus and is activated to indicate that his original signal is being acknowledged. The parties can then advance and meet. The apparatus may be further uniquely constructed to further indicate proper approach, such as by a progressively increasing signal. In a particularly novel construction, the apparatus may be further provided with a decoy means such that if the receiving party decides not to meet, the apparatus can be switched to create a false signal, such as the reversing of the characteristic created to assist the parties approaching each other. The apparatus in the broadest aspect employs either overt or covert indicating means, and the broadcast may be directional or non-directional. The broadcast itself, in a practical application, is not evident to the human senses, being, for example, a radio broadcast, an acoustical broadcast at frequencies out of the range of audibility or the like. Similarly, where the apparatus is to provide decoying, the response indicating means would be of the covert type.

As an example of one use of the present invention, the apparatus may be used at a dance or similar gathering of boys and girls. Code of signals for the evening may be posted or otherwise agreed on. A girl may encode her receiver to respond only to a transmitted encoded signal meaning "I am a male, I want to dance with you, my music preference is hard rock". When the signal is received, the receiver of the girl indicates receipt of the appropriate signal such that the male may approach her with assurance of acceptance based on interests in common. Generally, the female has a similar transceiver and may control her response such as transmission, either automatically or by positive act, of a properly encoded transmission which is, in turn, received by the transmitter. When such communication is established the male may move to the female by following the signal which will have a level related to the distance of separation. At any time she may switch off her receiver, transmitter or both. Within the broadest aspect of this invention, the receivers may merely have a coded response means such as visual display lamp or the like which is directly encoded or adjustable selection means to allow the receiver to vary the category within which the party is to be included. The dual selective control is, of course, preferred to allow complete control as subsequently discussed. By using directional apparatus and gain control the users can achieve various desired degrees of azimuthal and proximal selectivity.

Business, control and similar uses of the device may also be provided. For example, any number of safety personnel in a crowd can readily identify each other as law officers, or prospective bidders at an auction who desire to combine purchasing power in buying can rapidly and readily locate each other. In these and numberless other limited range situations better control can be exercised through identification of like interests among two or more people, simultaneously or sequentially, with evident or hidden signalling being employed as appropriate.

It will be appreciated that using integrated circuits, the devices can be made economically and in such small size as to fit conveniently into a conventional shirt pocket or trouser pocket. The units also provide a basic system which can be tailored to various functions and thus provide for rent as well as purchase of the units.

The present invention provides an improved and simple means for selective attraction of parties with selected common interests.

BRIEF DESCRIPTION OF DRAWINGS

The above and other objects and advantages of the system will become more readily apparent on examination of the following description, including the drawings, in which like parts are referred to by like reference numerals.

In the drawings.

DESCRIPTION OF ILLUSTRATED EMBODIMENT

Figure 1:
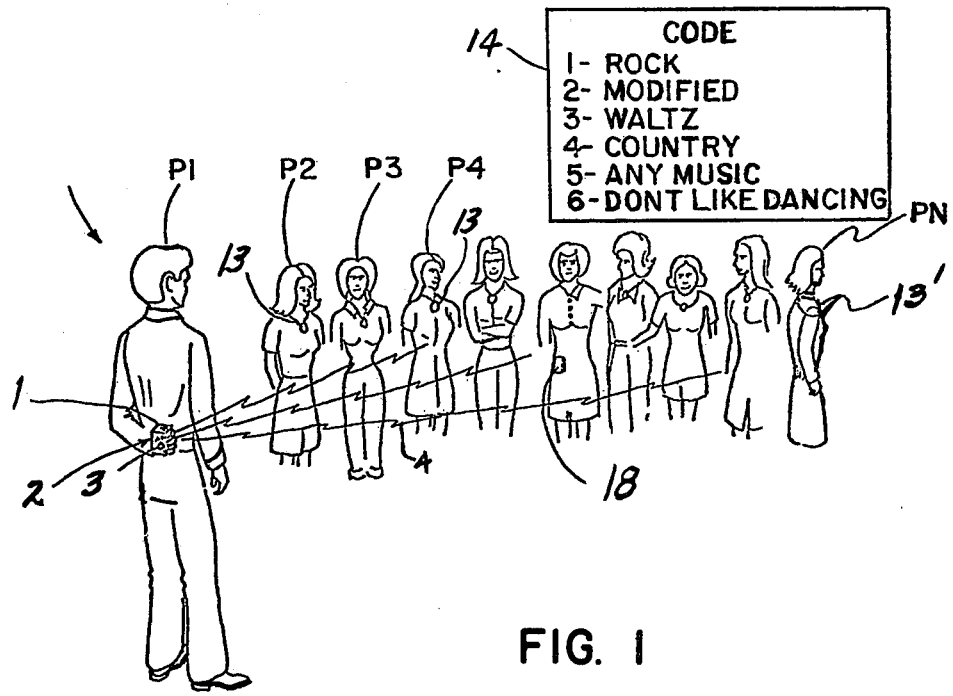
FIG. 1 is a perspective view of one embodiment of the invention in use.

FIG. 1 illustrates one embodiment of the invention in use for attracting and selecting male and female partners at a dance. The several persons are identified as $P_1$—PN. A first person $P_1$ presses an actuator 1 of a radio frequency transceiver 2 constructed in accordance with this invention. The transceiver 2 is set to transmit as shown at 4 at a selected frequency by a frequency adjustment or selector means shown as a rotary switch 3, such that the broadcast signal 4 is encoded to a particular class of partners with the general group in attendance at the gathering. Thus the various prospective partners $P_2$, $P_3$ . . . PN have similar transceivers 2 which, in the exemplifying dance situation portrayed, can respond to any one of the various encoded signals which can be transitted.

To respond only to initiators with announced tastes of interest corresponding to their interests, the prospective partners set their transceivers 2 such as by a coaxial control 3a to respond only to a signal of particular coding corresponding to their specific interests. The transceivers 2 may also provide for response control such that respondents can, by means of appropriate switching, automatically transpond to the initiator's unit. Thus, the decoded signal would simulate activation of the actuator 1. The recipient $P_2$—PN, thus provides a signal to the initiator $P_1$.

Upon receiving a response in synchronism with his signal transmittal, the initiator can approach the responder with confidence not only of mutual interest, but of receptive mood.

Figure 2:
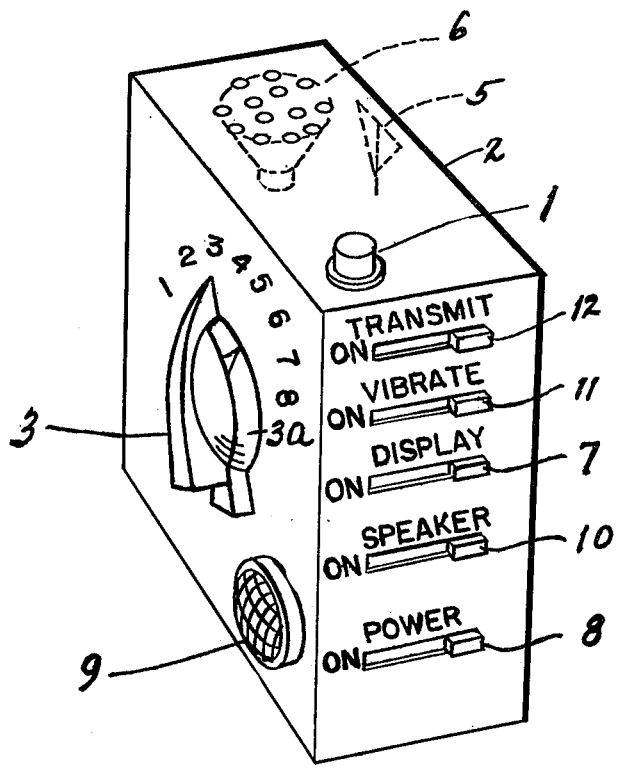
FIG. 2 is an isometric view of a transceiver.

FIG. 2 illustrates the exterior appearance of one embodiment of a radio-frequency transceiver 2 such as constructed for use according to this invention.

Selector switch or controls 3 and 3a provide for selective signal encoding and decoding, each channel being related to an operationally distinct frequency or an otherwise separately encoded signal.

Transmit button 1 energizes a conventional, internal circuit which broadcasts as at 4 by means of an antenna 5 to initiate signalling. The same antenna 5 may also receive signals according to conventional practice. The system preferably, as subsequently described, includes a timing means to provide time spaced transmission periods separated by reception periods. The received signals 4 are amplified by means of conventional IF and power circuits such audio oscillating techniques, to provide an audible output to the user by means of speaker 6. A control switch 7 may permit the user to control display of signals received on the preselected channel for audible or visual response if private communication is not desired. A power on-off switch 8 is shown to control use of the transceiver. The unit may also provide for usual audible communication via a microphone unit 9 under control of a switch 10. For other forms of physical response to a received signal, such as visual, vibration or the like, a corresponding output device may be actuated under a separate control switch 11. A switch 12 may provide for automatically transmitting a response or acknowledge signal in response to receiving a signal to which the decoding circuit is set.

Each transceiver 2 thus includes a response means such as an audible means, a visible means, or a vibratory signal reception indicator, preferably detectable only by the person receiving a transmission to establish completely private communication. The signal recipient may control the response by depression of his or her transmit button 1. The transceiver 2 may thus be set to return to the initiator a signal, or if switch 12 is operated, to automatically provide a transpond-response which automatically transmits such signal in response to receipt thereof.

In addition, a separate visual display such as a light-emitting diode 13 which is ribbon-hung around the necks of the prospective partners, may be provided and suitably connected to an output jack, not shown, in transceiver 2. Thus, an initiator may transmit a signal and by visual review look for an appropriate response. The displays may be made visible from front, and from the back as at 13'. This, of course, eliminates controlled approaches and may create confusion if a substantial number of people transmit at once and the various signals are simultaneously acknowledged.

In summary, to determine which of the prospective partners have compatible interests with his, the initiator first encodes his transmitter to emit a signal characteristic according to a code made available to all, as by wall plaque 14. Next he braodcasts the particular code he selects and waits for a partner or partners to response and thereby invite his attention.

Any one of those in attendance may, of course, be the initiators or responders, the example relating to a single initiator being given for simplicity of explanation only.

Using integrated circuit design and a few milliwatts of power the transceiver/display units can be made smaller than cigarette packages, for handy belt-clip, or pocket carriage, and still have the necessary range of at least several hundred feet such as required as the usual social gathering or even greater distances as determined by the particular application. As subsequently noted, the device may employ various signal sources such as radio energy, infrared energy or acoustical energy.

Figure 3:
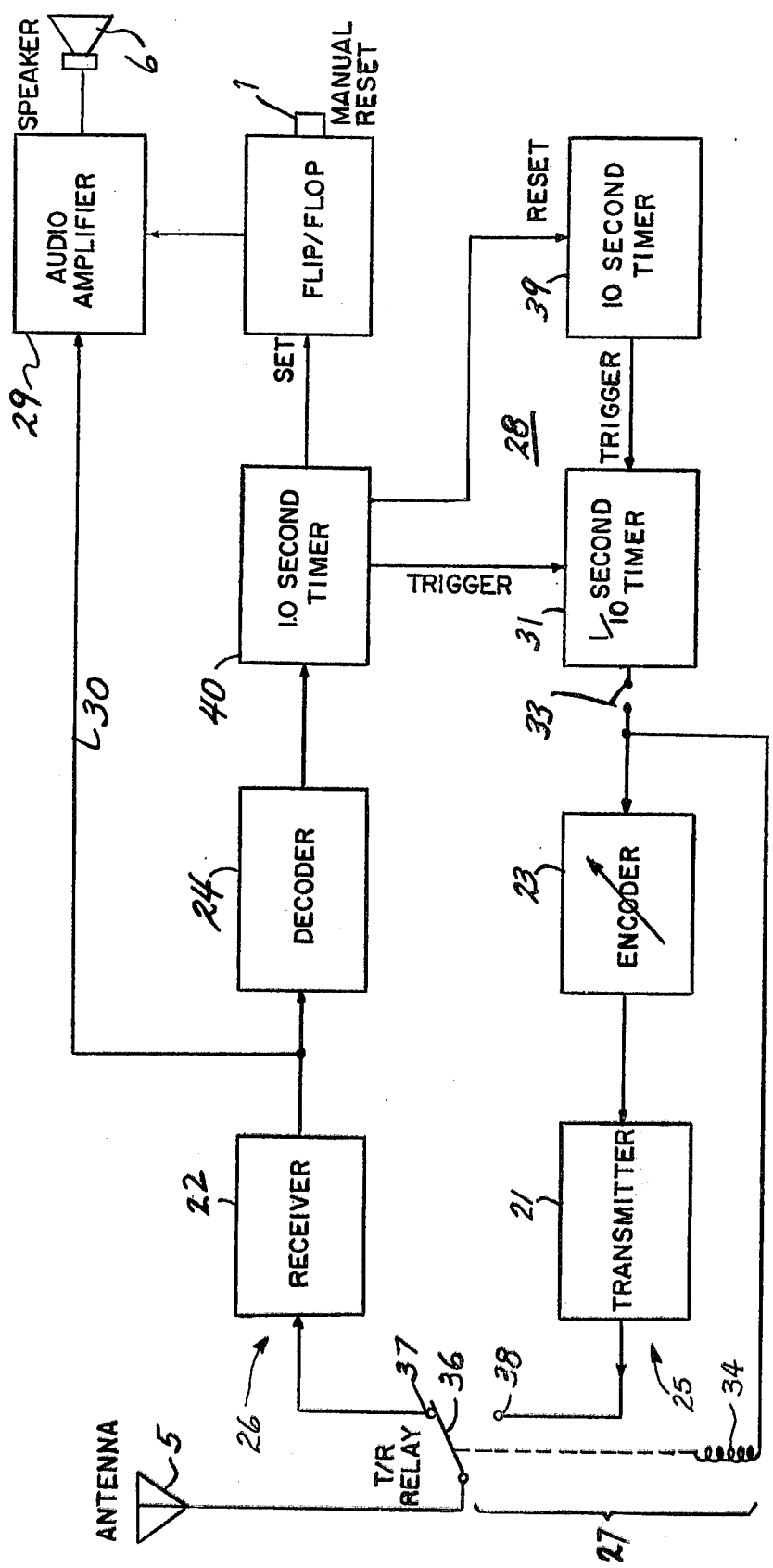
FIG. 3 is a block diagram of one embodiment.

FIG. 3 illustrates a block-diagram of an embodiment such as in FIGS. 1 and 2 employing an RF signal transmission and receipt and using a timed transmission-reception mode of operation.

In FIG. 3, the receiver and transmitter means are shown by blocks 21 and 22, respectively. They may be standard radio communications subsystems of any carrier frequency or modulation type, compatible with F.C.C. and International radio regulations. Obviously, carrier frequencies between units must be identical. Encoder and decoder 23 and 24 are connected to the transmitter 21 and receiver 22 respectively, and may employ various conventional schemes for exclusive encoding and decoding. As noted, the encoder in the transmitting unit establishes a unique signal which will be decoded only by a compatible, properly tuned decoder 24 in the corresponding receiving unit.

Figure 5:
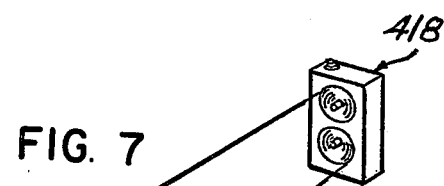
FIG. 5 illustrates a further embodiment providing a wide encoding range and a decoy means.

More particularly, the transceiver 2 of FIG. 3 is a dual channel unit including a transmission channel 25 and a reception channel 26. The channels 25 and 26 are alternately connected to the antenna 5 via a switching relay 27 which has a normal or standby state connecting the unit to receive transmitted signals. A timing means 28 interconnects the channels to provide sequential time spaced transmitted signals in response to creation of a transmission state and separated by signal reception periods, during which a response may be received. The transmission channel 25 includes the conventional transmitting unit 21 adapted to transmit any one of a plurality of selected frequency signals, each of which is encoded to a particular characteristic. The particular frequency signal is determined by a conventional encoder 23 forming an interconnected part of the transmitting unit. The transceiver 2 also includes the receiver 22 for receiving the various frequency signals, with the output coupled to decoder 24 for restricting the response to a particular selected frequency signal which is encoded to define a particular person type. The receiver output is also connected to an indicating device for signalling receipt of the signal. The device shown in FIG. 5 is the audible means 6 including an audio amplifier 29 which is conjointly controlled by the signal via line 30 and the output of the decoder 24 as hereinafter described. The encoder 23 and decoder 24 may be preset to a single signal but preferably include an adjustable means such as controls 3 and 3a to permit adjustment of the several signals to be transmitted and/or received.

The timing means 28 includes a pulse or short period timer 31 connected to the encoder 23 via a transmit control switch 33 and to the winding 34 of the control relay 27 via line 35. Thus, simultaneously with the creation of a transmission control signal, the relay 27 is actuated to connect the antenna 5 to the transmitter 21. Relay 27 is shown as a single pole, double throw switch having a common pole 36 connected to the antenna 5 and selectively moved from normal engagement with the reception contact 37 into engagement with the transmit contact 38.

The pulse or short period timer 31 is responsive to a main timer 39 set for creating time spaced activation of timer 31. The main timer is set for relatively long periods such as ten seconds and the transmitted signals are thus sent every ten seconds.

Figure 4:
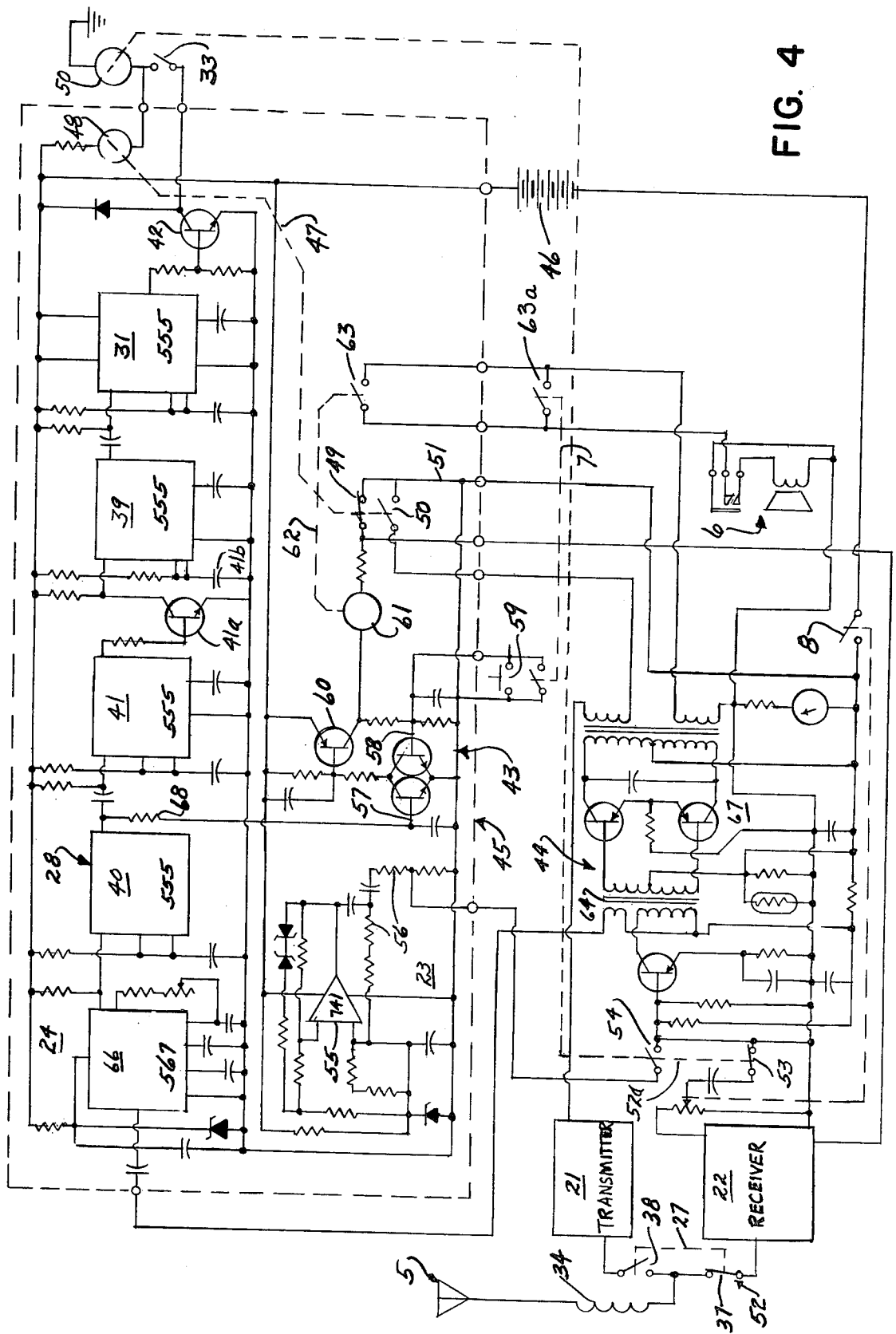
FIG. 4 is a more detailed schematic of the system such as shown in FIG. 3.

The 1/10 timer 31 is also adapted to be activated in response to operation of a timer 40 in the reception channel 26. Timer 40 establishing a delay period during which the transmission unit can revert to a receiving unit for receiving of an acknowledge signal. The timer 40 is then operable to reset the ten second timer 39 and trigger the 1/10 second timer 31. In the circuit of FIG. 4, the timer 40 drives a "one-shot" unit 41, the output of which includes a transistor 41a connected to the 10 second timer 39. The transistor discharges a capacitor 41b of timer 39 and resets this timer. This simultaneously triggers the 1/10 second timer 31 to produce an output pulse to a drive transistor 42, after which the timer 31 is off until the 10 second timer resets, either as a result of a timing out or again being reset from timer 39. The output of the one second timer 40 also activates a flip-flop unit 43 to produce an output for energizing the audio amplifier 29 and producing energization of the reception indicator, such as the speaker 6. The flip-flop unit 43 is also coupled to the transmit control button 1 which is operable to reset the circuit and turn-off the audio amplifier 29 simultaneously with the closing of a transmit switch 33.

The several components may be readily provided based upon conventional signal transmission and reception design by those skilled in the art. A typical simplified transceiver unit 2 is shown in FIG. 4 in which an audio transceiver, such as a Model TRC-25A sold by Radio Shack Corporation, is provided with an adapter circuit including a switch to provide a pair of fixed frequency outputs.

In FIG. 4, the transceiver 2 is illustrated with the standard receiving and transmitting circuits, which are shown in block diagram, having a common power or audio section 44 coupled to speaker 6 as a reception indicator or to the transmitter 21 for sending a coded signal. The switching means are provided within such common audio section 44 to produce the alternate transmission and reception via an adaptor circuit 45 which includes the timing and relay control means therefore. The power switch 8 is connected in the B-1 side of the power supply, shown connected to the negative side of the battery 46.

The transmit enable switch 33, controlled by switch control 12, is shown connected to the output of the 1/10 second timer 31 for operating a power control relay 47 and the transmit-antenna control relay 27.

Relay 47 is a double pole switch unit having a winding 48 connected in circuit to the output of the 1/10 second timer 31 and having a set of normally closed contacts 49 for establishing signal reception and a set of normally open contacts 50 for establishing signal transmission. The normally closed contacts 49 connect switched B-supply line 51 to the reception circuit 26 including the flip-flop circuit 43 and the receiver 22 from the battery 46 via the on-off power switch 8 which is shown connected in the negative side of the battery.

The normally open contacts 50 connect the switched B-line 51 to the transmitter 21. Thus, whenever relay 47 is energized, the circuit is connected to transmit a pulse signal.

Simultaneously, the control relay 34 which is also connected to the output of the timer circuit, is actuated. Relay 34 controls two sets of double throw contact units 52 and 52a for switching the antenna 5 from reception to transmission and for coupling the encoder 23 to the transmitter 21. Thus, contact unit 52 includes antenna relay contacts 37–38 of FIG. 3 and in particular includes normally closed contact 37 connecting the antenna 5 to the receiver 22 and normally open contact 38 connecting the antenna 5 to the transmitter 21.

The second contact set 52a includes normally closed contact 53 connecting the receiver 22 to the common power or audio section 44 of the standard transceiver and a set of normally open contacts 54 connecting the output of the encoder 23 to the audio section 44 for coupling to the switched transmitter 21.

Thus, as shown in FIG. 4, the adapter 45 includes the ten second timer connected to actuate the 1/10 second timer for actuating relays 47 and 27 for 1/10 of a second after a ten second delay.

The encoder 23 is illustrated as a known free-running circuit having the usual resister-capacitor elements and an amplifier 55 with the resister elements 56 selected to control the appropriate frequencies. For example, in the illustrated embodiment, one unit is set to transmit at 1474 Hz indicating a particular type of dancer while a second reception unit transmits at 1172 Hz to acknowledge receipt of such a request and that the receptionist corresponds thereto. In actual practice, the encoder 23 would permit selection of the various encoded signals for selection by the user. As such detail can be readily provided by those skilled in the art, such detail is not given for purposes of simplicity and clarity of explanation.

The flip-out unit 43 is a conventional known type unit having an input 57 connected to the receiver driven one second timer 40 and a second input 58 connected to a reset switch 59 coupled to the actuator button 1. When the button is actuated, the switch 59 is closed and the flip-flop unit 43 triggered to mute the audio output to the speaker 6. The flip-flop circuit 43 includes an output transistor 60 connected to energize a winding 61 of a mute control relay 62 which cuts off the speaker during the transmission period. As shown, the relay 62 controls a set of normally open contacts 63 connecting the output of the audio amplifier stage to the speaker 6. The contacts 63 are in parallel with the manually controlled speaker mute switching 63a, controlled by the speaker control switch 7.

The receiver 22 is, as previously noted, connected to the audio section 44 via the relay 27 having the relay winding 34 coupled to control normally closed contacts 53 and normally open contacts 54. Contacts 53 connect the receiver 22 to the audio section 44 which includes an output transformer 64 connected to drive the decoder 66, which is also shown in one embodiment in FIG. 4, connected for selective operation of timer 40, the flip-flop circuit 43 and related elements. The receiver signal is also directly applied via the output amplifier 67 to the speaker output relay contacts 63 of the adaptor, which, in turn, is controlled by the switching of flip-flop circuit 43. In FIG. 4, the decoder stage 24 is shown as a well-known active tone decoder 66 employing a 567 chip with appropriate resistance and capacitive elements, the values of which determine the particular frequency signal which will be received and transmitted. The decoder 66 is preferably provided with a means coupled to control 3a for selection of the encoded signal to be decoded such as the illustrated variable potentiometer which can control the frequency. For example, in one embodiment of a pair of specially matched units, one unit was set to decode a 117 Hz signal and the other a 1474 Hz signal. The units, as subsequently discussed, transmitted the opposite frequency signal in accordance with the previously described encoding.

The output of the decoder stage 66 is connected to the one second timer 40, shown as an appropriately connected integrated circuit 555, the output of which is connected via a coupling resistor 68 to the flip-flop circuit 43.

Figure 6:
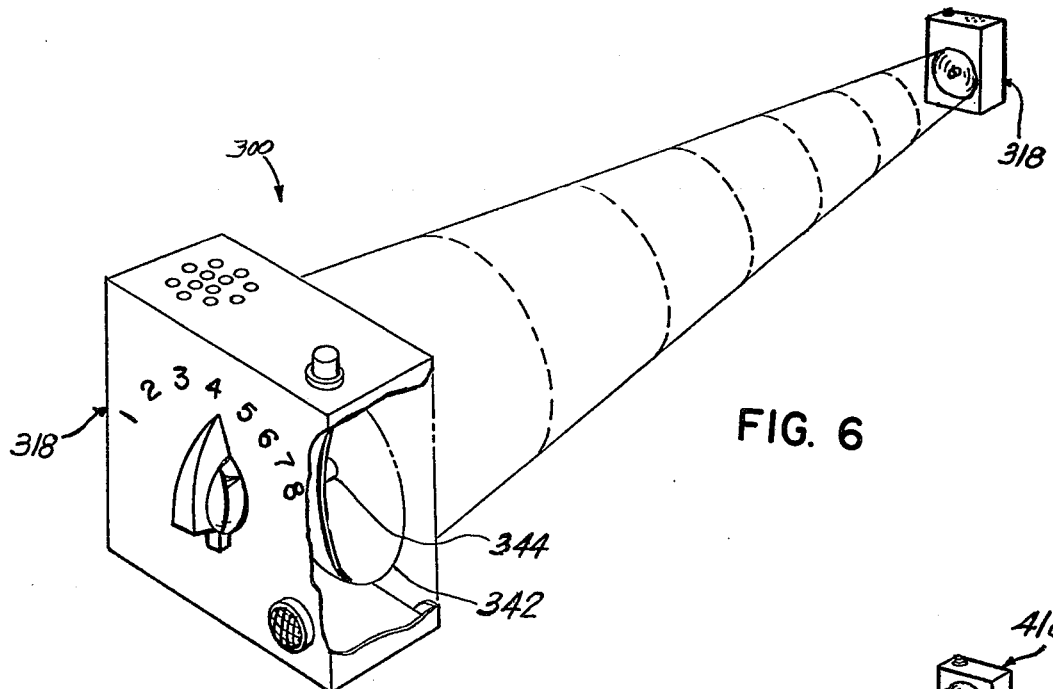
FIGS. 6 and 7 analogously diagram further embodiments, with parts broken away and sectioned to show certain details.

Coaction of the units of the system elements, such as shown in FIGS. 5 and 6, will be best described by two examples, applied to a dance situation with the frequency 1474 Hz encoded to "I am a male, and prefer rock music". The acknowledge signal is encoded to 1172 Hz.

The first example assumes that the one unit 2 is operating with no compatible set unit 2 in the immediate vicinity. The power is turned on via switch 8 and the manual reset or transmit button 1 is depressed. The flip-flop is set and audio amplifier 29 is now muted. The ten second timer 39 is running and, at the end of ten seconds (all time delays are arbitrary), the 1/10 second timer 31 triggers and causes a 1/10th second encoded transmission of a 1474 Hz signal to occur. This timer also operates the antenna relay 27 in the model although this function can be eliminated, if desired, with conventionally modified transmitter/receiver designs. This unit is set to decode the acknowledge signal of 1172 Hz. If an acknowledge signal is not received and decoded, the ten second timer being free-running, the process repeats every 10th second.

The second example assumes a compatible pair of units 2 operating within radio communication range of each other. The first unit operates as in the first example. When the second unit receives the 1474 Hz signal, the decoder 66 functions to decode the valid encoded signal and triggers its one second timer 40 which immediately triggers the flip-flop 43 causing the audio amplifier 29 to unmute the speaker 6 and alter the user of the first unit. The relay 27 is of course deenergized and the receiver 22 transmits the received signal via the amplifying stage and coupling transformer 64 to the decoder 66. The message is also transmitted via the output stage 67 of section 44 and the speaker control relay contacts 63 to the speaker 6. The one-second timer 40 also resets the ten second timer 39, for example, on its leading edge and thereby triggers the 1/10 second timer 31, for example, on its trailing edge. The other unit 2 which had decoded the valid message may automatically or selectively assume a like operating mode to that of the first. Thus, the second unit 2 is now actuated via button 1 and related switch 59 by the user to transmit the unique 1172 Hz signal which, in turn, is decoded by the first unit 2 of the initiator. The decoder output of the first unit directly resets the ten second timer and actuates the 0.1 second timer. The two units are now both transmitting the respective unique request and acknowledge signals for 1/10 second every 1.1 second and both users have active audio circuits. Proximity of one unit to the other can be approximated by audio signal strength in the demonstration units, but more sophisticated techniques could be employed.

The audio amplifier and speaker in this diagram symbolize not only audible, but a vibratory or visible output, both, or all three. Transponding may be provided. For example, an auxiliary switch, not shown, which is coupled, for example, to the relay 62 for delayed operation and connected in parallel with the reset switch 59 may be provided such that the speaker is unmuted to signal receipt of a decoded signal followed by resetting of the speaker and transmission of the acknowledge signal.

An alternate embodiment is diagrammatically illustrated in FIG. 5 in which the encoder or tone source 23 is derived from a multivibrator circuit of a known construction. The multivibrator is D.C. driven from the battery 46a and the input and coupling resistors-capacitors 71–72. The output level of the multivibrator is modulated by a D.C. bias signal derived via a line 73 from the AVC signal circuit of the receiver 22. Line 73 includes a coupling resistor 74. The resistance coupling controls the change level associated with the approach of the parties.

With this construction, a decoy system may be provided by connection of a normally closed switch 75 in the AVC bias line 73. When the switch 75 is opened, the AVC signal is removed and the person always appears distant. In place of a switch 75, a potentiometer could be employed to artificially create a false range response, thereby effecting the desired result.

The multivibrator is a well-known and high reliable circuit and can provide a substantial number of different frequencies over a relatively wide range. In a practical construction, this would, of course, be significant in permitting encoding of a substantial number of characteristics or categories.

FIG. 6 illustrates in partial section an alternate embodiment 300 of the invention similar to that of the previous embodiment except that a parabolic reflector 342 is provided in each transceiver 318 with ultrasonic transducer 344 at the focus according to conventional practice, substituting for the corresponding transmit-/receive portions the first embodiment, other features being similar. Such transducers serve conveniently as emitter and detector. With a parabolic reflector feature, this embodiment is more directional than the first embodiment. Conventional garage door and TV-remote control type circuitry can be employed in this embodiment.

Figure 7:
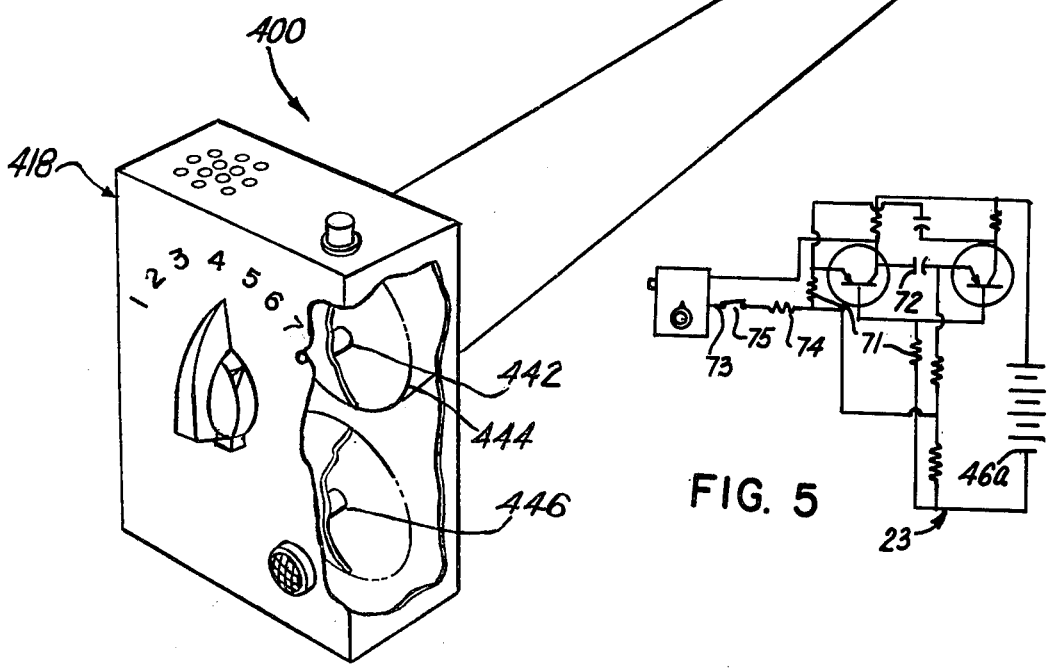

FIG. 7 illustrates in partial section a further embodiment 400 also directional if desired. Each transceiver 418 includes a parabolic reflector 442 and infrared source 444 provided in this embodiment and an infrared detector 446. In accordance with accepted practice this could be a coaxial arrangement as an alternative.

In the latter two embodiments encoding may be conveniently and conventionally accomplished through pulsing by tuned, relatively low-frequency oscillator circuits which, in the receiving mode, may actuate frequency-sensitive switch circuitry on the power side.

This invention is not to be construed as limited to the particular forms disclosed herein, since these are to be regarded as illustrative rather than restrictive. It is, therefore, to be understood that the invention may be practiced within the scope of the claims otherwise than as specifically described.

Various modes of carrying out the invention are contemplated as being within the scope of the following claims, particularly pointing out and distinctly claiming the subject matter which is regarded as the invention.

I claim:

1. An interpersonal-signal apparatus for selective signalling of at least two persons each having a small portable transceiver adapted for personal use and selectively operable as a request unit and as an acknowledge unit, said transceivers comprising radio signal broadcasters being of a size adapted to be hand carried and attached on human apparel for support such as a conventional shirt pocket, a conventional trouser pocket, a belt and the like, each transceiver comprising a transmission channel and a receiver channel whereby the use of two separate transceivers permits signalling between the two persons, said transmission channel of said one transceiver operating as a request unit including a signal transmission means for broadcasting a first signal having a unique characteristic encoded to a particular personal trait and having selector means for personal selection of the first signal for transmission, said receiver means having a decoding means responsive to a second signal from said acknowledge unit having a unique characteristic encoded to acknowledgement of said first signal, said decoding means being settable to respond to a selected second signal from said acknowledge unit and having selector means to set said decoding means to one of said second signals, said second of the transceivers operating as an acknowledge unit with said decoding means of said receiver channel of said acknowledge unit responsive to said first signal and said transmission channel of said acknowledge unit broadcasting said second signal, means to indicate an output of said request unit decoding means and said first and second transceiver means include signal modifying means to increase the signal level as the distance between a pair of transceivers approach each other for directing the requesting and acknowledging persons to facilitate movement toward each other and including decoy means for establishing a false signal condition and including means to disconnect the signal modifying means thereby thwarting such facilitated movement.

2. An interpersonal-signal apparatus for selective signalling of at least two persons each having a small portable transceiver adapted for personal use and selectively operable as a request unit and as an acknowledge unit, said transceivers being of a size adapted to be hand carried and attached on human apparel for support such as a conventional shirt pocket, a conventional trouser pocket, a belt and the like, each transceiver comprising a transmission channel and a receiver channel whereby the use of two separate transceivers permits signalling between the two persons, said transmission channel of said one transceiver operating as a request unit including a signal transmission means for broadcasting a first signal having a unique characteristic encoded to a particular request, said transmission means being operable to transmit a plurality of different first signals each encoded to a particular personal trait and having selector means for personal selection of the first signal for transmission, said receiver channel of said request unit including a signal receiver means having a decoding means responsive to a second signal from said acknowledge unit having a unique characteristic encoded to acknowledgement of said first signal, said decoding means being settable to respond to a selected second signal from said acknowledge unit and having selector means to set said decoding means to one of said second signals, said second of the transceivers operating as an acknowledge unit with said decoding means of said receiver channel of said acknowledge unit responsive to said first signal and said transmission channel of said acknowledge unit broadcasting said second signal, means to indicate an output of said request unit decoding means, said first and second transceiver means include signal modifying means for directing the requesting and acknowledging persons to facilitate movement toward each other, and timing means operable to transmit at a first periodic rate when requesting a person and at a second periodic rate when acknowledging receipt of either one of a request signal and an acknowledge signal.

3. An interpersonal-signal apparatus for selective signalling of at least two persons each having a small portable transceiver adapted for personal use and selectively operable as a request unit and as an acknowledge unit, said transceivers being of a size adapted to be hand carried and attached on human apparel for support such as a conventional shirt pocket, a conventional trouser pocket, a belt and the like, each transceiver comprising a transmission channel and a receiver channel whereby the use of two separate transceivers permits signalling between the two persons, said transmission channel of said one transceiver operating as a request unit including a signal transmission means for broadcasting a first signal having a unique characteristic encoded to a particular request, said transmission means being operable to transmit a plurality of different first signals each encoded to a particular personal trait and having selector means for personal selection of the first signal for transmission, said receiver channel of said request unit including a signal receiver means having a decoding means responsive to a second signal from said acknowledge unit having a unique characteristic encoded to acknowledgement of said first signal, said decoding means being settable to respond to a selected second signal from said acknowledge unit and having selector means to set said decoding means to one of said second signals, said second of the transceivers operating as an acknowledge unit with said decoding means of said receiver channel of said acknowledge unit responsive to said first signal and said transmission channel of said acknowledge unit broadcasting said second signal, means to indicate an output of said request unit decoding means, said first and second transceiver means include signal modifying means for directing the requesting and acknowledging persons to facilitate movement toward each other, and timing means to actuate said signal transmission means to periodically transmit said first signal and having means responsive to decoding of said second signal to change the periodic rate of said first signal.

4. The apparatus of claim 3 wherein said timing means includes a first timer having a first timing period, a second timer of a substantially shorter timing period than said first timer and connected to be actuated by said first timer, and a third timer actuated by said decoding means operable to actuate said second timer and to reset said first timer, said third timer having an intermediate timing period intermediate said first and second timers.

5. An interpersonal-signal apparatus for selective signalling of at least two persons each having a small portable transceiver adapted for personal use and selectively operable as a request unit and as an acknowledge unit, said transceivers being of a size adapted to be hand carried and attached on human apparel for support such as a conventional shirt pocket, a conventional trouser pocket, a belt and the like, each transceiver comprising a transmission channel and a receiver channel whereby the use of two separate transceivers permits signalling between the two persons, said transmission channel of said one transceiver operating as a request unit including a signal transmission means for broadcasting a first signal having a unique characteristic encoded to a particular request, said transmission means being operable to transmit a plurality of different first signals each encoded to a particular personal trait and having selector means for personal selection of the first signal for transmission and including an encoder for selecting one of a plurality of request signals each having a different unique characteristic encoded to a particular request, first and second timers of a long and a short period connected in series to actuate the encoder at a predetermined frequency equal to the sum of said periods, said receiver channel of said request unit including a signal receiver means having a decoding means responsive to a second signal from said acknowledge unit having a unique characteristic encoded to acknowledgement of said first signal and having a third timer of a period intermediate said long and short periods connected to said decoding means, said third timer being connected to reset the first timer and to actuate the second timer and thereby broadcast at the sum of the second and third timers, said decoding means being settable to respond to a selected second signal from said acknowledge unit and having selector means to set said decoding means to one of said second signals, said second of the transceivers operating as an acknowledge unit broadcasting said second signal, means to indicate an output of said request unit decoding means, and said first and second transceiver means include signal modifying means for directing the requesting the acknowledging persons to facilitate movement toward each other.

6. The apparatus of claim 5 having an indicating means connected to be driven from said decoding means, said indicating means having an input control means connected to said third timer and to a manual control means for disabling the indicating means during broadcast from its transmission channel.

7. The apparatus of claim 6, wherein said indicating means is a loudspeaker, and said input control means includes switch means connected to mute the loudspeaker.

8. An interpersonal-signal system for selective signalling of at least two persons, comprising a plurality of transceiver units one for each of said at least two persons and each of which is adapted to be set to operate as a request unit and as an acknowledge unit and in operation a first transceiver set to operate as a request unit and the second as an acknowledge unit, each of said units including a transmission channel and a receiver channel, said transmission channel of said request unit including a signal transmission means for selective broadcasting of one of a plurality of request signals each having a unique characteristic encoded to a particular request, manually operable selector means for selecting the particular one of said request signals for broadcast, said receiver channel of said request unit including a signal receiver means having a decoding means responsive to receipt of an acknowledge signal from said acknowledge unit having a unique characteristic encoded to acknowledgement of said request, said acknowledge unit including a receiver means having a decoding means including selector means for presetting of the receiver means to be responsive to the particular one of said request signals and having a transmission means for broadcasting the acknowledge signal having said unique acknowledgement characteristic for acknowledging receipt of the particular one of the request signals, each of said receiver means of each transceiver unit includes an automatic volume control means, said transceiver means each having directing means to facilitate movement of requesting and acknowledging persons toward each other and including response control means including amplifying means with an automatic gain control input to relate the output of the transmission means to the distance between said persons to relate the output of the receiver means of the transceiver units to the distance between said persons, each of said transceiver units having a small personal portable support means, said transmission means and receiver means being affixed to said corresponding support means.

9. The system of claim 8, wherein said response control means includes a manual switch means to open the connection of said gain control input to said volume control means and thereby maintain said output at an original output.

* * * * *

UNITED STATES PATENT AND TRADEMARK OFFICE
CERTIFICATE OF CORRECTION

PATENT NO. : 4,173,016
DATED : October 30, 1979
INVENTOR(S) : DICKSON, CARLISLE H.

It is certified that error appears in the above-identified patent and that said Letters Patent are hereby corrected as shown below:

Title Page of Patent [22], Cancel "Filed: Jan. 4, 1973" and insert ---Filed: Jan. 4, 1978---

Column 4, Line 51, Cancel "response" and substitute therefor ---respond---

Column 5, Line 62, After "timer 40" insert ---is set for an intermediate period such as one second. This---

Column 7, line 19, After "The" cancel "flip-out" and substitute therefor -- flip-flop --.

Signed and Sealed this

Twenty-eighth Day of April 1981

[SEAL]

Attest:

RENE D. TEGTMEYER

Attesting Officer

Acting Commissioner of Patents and Trademarks